US010270985B2

(12) United States Patent
Kamhi et al.

(10) Patent No.: US 10,270,985 B2
(45) Date of Patent: Apr. 23, 2019

(54) AUGMENTATION OF TEXTUAL CONTENT WITH A DIGITAL SCENE

(71) Applicant: Intel Corporation, Santa Clara, CA (US)

(72) Inventors: Gila Kamhi, Zichron Yaakov (IL); Barak Hurwitz, Kibbutz Alonim (IL); Ron Ferens, Ramat Hasharom (IL); Amit Moran, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 14/475,747

(22) Filed: Sep. 3, 2014

(65) Prior Publication Data

US 2016/0065860 A1    Mar. 3, 2016

(51) Int. Cl.
*G06F 3/048* (2013.01)
*H04N 5/265* (2006.01)
(Continued)

(52) U.S. Cl.
CPC ......... *H04N 5/265* (2013.01); *G06F 17/3087* (2013.01); *H04N 7/183* (2013.01);
(Continued)

(58) Field of Classification Search
None
See application file for complete search history.

(56) References Cited

U.S. PATENT DOCUMENTS

| 7,394,459 B2 | 7/2008 | Bathiche et al. |
| 8,705,893 B1 | 4/2014 | Zhang et al. |

(Continued)

FOREIGN PATENT DOCUMENTS

| KR | 10-1080803 B1 | 11/2011 |
| KR | 10-2012-0125730 A | 11/2012 |

(Continued)

OTHER PUBLICATIONS

International Search Report and Written Opinion dated Feb. 24, 2015 for International Application No. PCT/US2014/065764; 11 pages.

(Continued)

*Primary Examiner* — William C Trapanese
(74) *Attorney, Agent, or Firm* — Schwabe, Williamson & Wyatt, P.C.

(57) ABSTRACT

Computer-readable storage media, computing devices and methods are discussed herein. In embodiments, a computing device may include one or more display devices, a digital content module coupled with the one or more display devices, and an augmentation module coupled with the digital content module and the one or more display devices. The digital content module may be configured to cause a portion of textual content to be rendered on the one or more display devices. The textual content may be associated with a digital scene that may be utilized to augment the textual content. The augmentation module may be configured to dynamically adapt the digital scene, based at least in part on a real-time video feed, to be rendered on the one or more display devices to augment the textual content. Other embodiments may be described and/or claimed.

21 Claims, 7 Drawing Sheets

(51) Int. Cl.
  *H04N 7/18* (2006.01)
  *H04N 21/431* (2011.01)
  *H04N 21/422* (2011.01)
  *H04N 21/4223* (2011.01)
  *H04N 21/462* (2011.01)
  *H04N 21/4722* (2011.01)
  *G06F 17/30* (2006.01)

(52) U.S. Cl.
  CPC ... *H04N 21/4223* (2013.01); *H04N 21/42202* (2013.01); *H04N 21/4316* (2013.01); *H04N 21/4622* (2013.01); *H04N 21/4722* (2013.01)

(56) References Cited

U.S. PATENT DOCUMENTS

| | | |
|---|---|---|
| 2006/0038983 A1 | 2/2006 | Mallinson et al. |
| 2009/0322671 A1* | 12/2009 | Scott ............... G06K 9/32 345/156 |
| 2011/0187746 A1 | 8/2011 | Suto et al. |
| 2012/0023611 A1 | 9/2012 | Rhee et al. |
| 2012/0236119 A1* | 9/2012 | Rhee ............... G01S 3/7864 348/46 |
| 2012/0262486 A1 | 10/2012 | Raghoebardajal et al. |
| 2014/0002496 A1* | 1/2014 | Lamb ............... G06F 3/14 345/633 |
| 2014/0024453 A1 | 1/2014 | Eberwein et al. |
| 2014/0028850 A1 | 1/2014 | Keating et al. |
| 2014/0017802 A1 | 6/2014 | Raheman et al. |
| 2014/0210710 A1* | 7/2014 | Shin ............... G06T 11/60 345/156 |
| 2015/0062120 A1 | 3/2015 | Reisner-Kollmann et al. |
| 2015/0123966 A1* | 5/2015 | Newman ............... G06T 19/006 345/419 |
| 2016/0269622 A1* | 9/2016 | Melnyk ............... G03B 17/18 |

FOREIGN PATENT DOCUMENTS

| | | |
|---|---|---|
| KR | 10-1250619 B1 | 4/2013 |
| KR | 10-2014-0097657 A | 8/2014 |

OTHER PUBLICATIONS

Office Action dated Feb. 11, 2016 for U.S. Appl. No. 14/269,782, 22 pages.
International Search Report and Written Opinion dated Nov. 5, 2015 for International Application No. PCT/US2015/041165, 14 pages.
Office Action dated Feb. 11, 2016 for U.S. Appl. No. 14/269,782, 19 pages.
International Preliminary Report on Patentability dated Jul. 14, 2016 for International Application No. PCT/US2014/065764; 8 pages.
Final Office Action dated Dec. 21, 2016 for U.S. Appl. No. 14/269,782, 25 pages.
International Preliminary Report on Patentability dated Mar. 16, 2017 for International Application No. PCT/US2015/041165, 11 pages.

* cited by examiner

AUGMENTATION OF TEXTUAL CONTENT WITH A DIGITAL SCENE

TECHNICAL FIELD

Embodiments of the present disclosure are related to the field of augmented reality, and in particular, to augmentation of textual content with a digital scene.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Textual content such as physical or electronic books contain many elements that may elude the senses. When reading an electronic book the reader has to rely on the reader's own imagination to visualize what is described in the book. As such, the reader may miss out on details of the book.

DETAILED DESCRIPTION OF ILLUSTRATIVE EMBODIMENTS

Methods, computer-readable media, and computing devices associated with augmentation of textual content with a digital scene are described herein. In embodiments, a computing device may include one or more display devices, a digital content module coupled with the one or more display devices, and an augmentation module coupled with the digital content module and the one or more display devices. The digital content module may be configured to cause a portion of textual content to be rendered on the one or more display devices. The textual content may be associated with a digital scene that may be utilized to augment the textual content. The augmentation module may be configured to dynamically adapt the digital scene, based at least in part on a real-time video feed, to be rendered on the one or more display devices to augment the textual content. For example, the portion of textual content may be a page from an electronic book and the digital scene may be designed to depict a scene described by the page from the electronic book. As such, a user of the computing device may be able to not only read and imagine what is described by the page of the electronic book, but may also be able to see what is described by the page come to life on the display via the digital scene.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
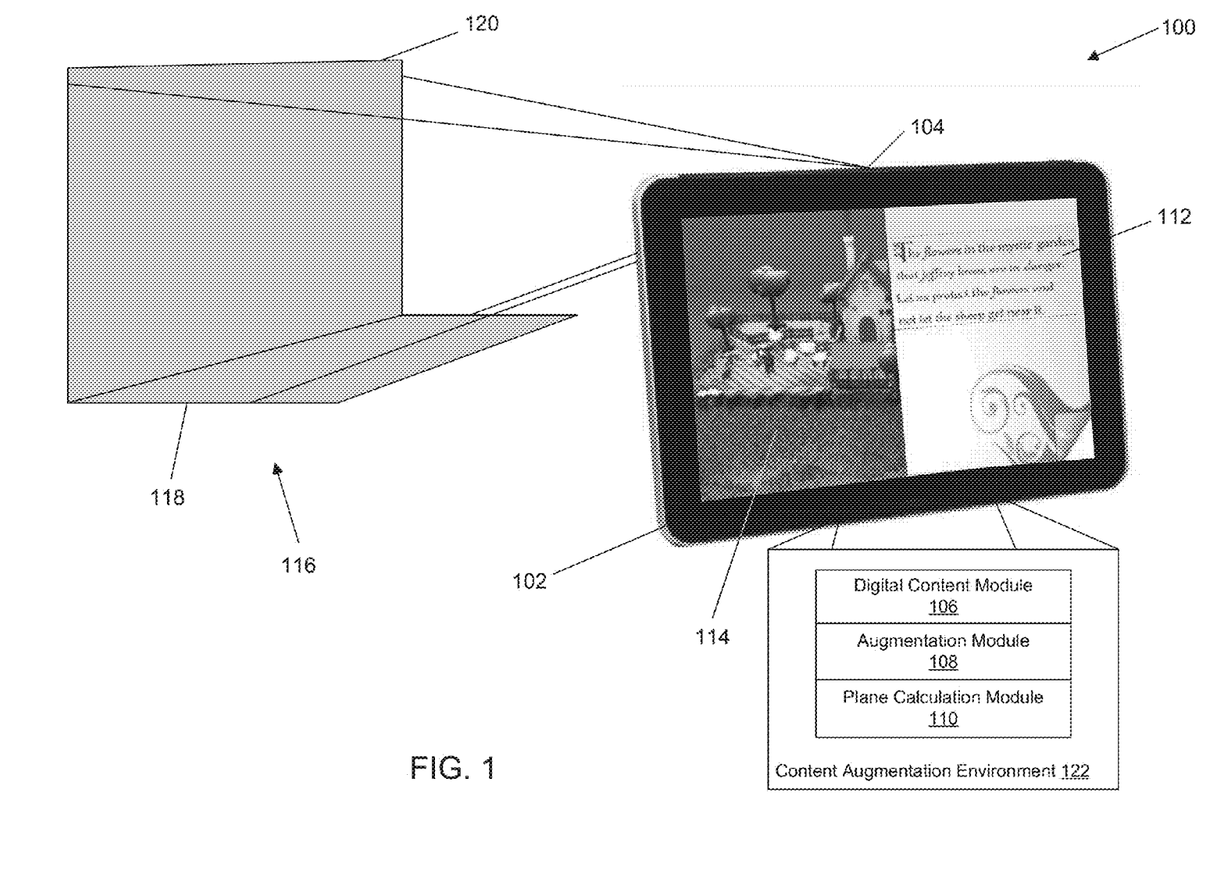
FIG. 1 illustrates a computing environment, in accordance with various embodiments of the present disclosure.

FIG. 1 illustrates a computing environment 100 in accordance with various embodiments of the present disclosure. Computing environment 100 may include computing device 102 which may include content augmentation environment 122. Content augmentation environment 122 may include a digital content module 106, an augmentation module 108, and a plane calculation module 110. Each of these modules is discussed further below. Computing environment 100 may further include a camera 104 coupled with computing device 102. While depicted herein as being integrated into computing device 102, camera 104 may, in some embodiments, be peripherally attached to computing device 102. In embodiments where camera 104 is peripherally attached, camera 104 may be communicatively coupled with computing device 104 via any wired or wireless connection suitable for transmitting data captured by camera 104.

Camera 104 may be disposed in computing environment 102 and configured to capture a real-time video feed of a physical scene (e.g., physical scene 116). In embodiments, camera 104 may be configured to capture both depth and color information in individual frames of the video feed. In such embodiments, camera 104 may incorporate a depth sensor, such as, an infrared emitter utilized in combination with an infrared image capturing sensor, as well as a two dimensional (2-D) image capturing sensor, such as a red, green and blue (RGB) camera sensor. Computing device 104 may be configured to receive these captured images from camera 112 and provide the captured images to augmentation module 108.

Digital content module 106 may, in some embodiments, be configured to cause a portion of textual content (e.g., textual content 112) to be rendered on a display device of computing device 102. In some embodiments, digital content module 106 may be configured to merely receive the portion of textual content and format the portion of textual content for rendering on the computing device 102. In such embodiments, the portion of textual content may be received locally from another component of computing device, such as, for example, an electronic-book (e-book) application. In other embodiments, digital content module 106 may be configured to retrieve the portion of textual content from a storage device, either local or remote, in response to selection of the portion of textual content by a user of computing device 102 or at the instruction of another component of computing device 102, such as the e-book application mentioned above. In embodiments, the portion of textual content may be a portion of a digital book, digital magazine, or any other suitable textual content source.

In embodiments, the portion of textual content may be associated with a digital scene (e.g., the digital scene depicted in augmentation video scene 114). This association of the portion of textual content with the digital scene may take any suitable form. For instance, the association may be contained in metadata associated with either or both of the portion of textual content or the digital scene; the association may be made via a relational database that relates the portion of textual content to the digital scene; the association may be made by packaging the digital scene and the portion of textual content into a single file; or any other suitable manner of association. In embodiments where the portion of textual content is associated with the digital scene by being packaged into a single file, the single file may contain additional portions of textual content along with additional digital scenes, respectively associated with the additional portions of textual content. For example, if the textual content is a digital book, then the portions of textual content may correspond with chapters, pages, or passages of the digital book and each of the chapters, pages, or passages may be individually associated with respective digital scenes which may all be contained within a single file. The digital scene may include static images and/or animated images to augment the portion of textual content.

Augmentation module 108 may be coupled with digital content module 106 as well as camera 104. In embodiments, augmentation module 108 may be configured to dynamically adapt the digital scene, or any portion thereof, associated with the portion of textual content based on the real-time video feed captured by camera 104. In some embodiments, to dynamically adapt the digital scene, augmentation module 108 may incorporate the digital scene, or any portion thereof, with the real-time video feed captured by camera 104 to produce augmentation video feed 114 to augment textual content 112. For instance, as depicted in FIG. 1, augmentation module 108 may receive real-time video feed of physical scene 116 and may overlay, or superimpose, the digital scene on the real-time video feed of physical scene 116 to produce augmentation video feed 114. For example, as depicted, textual content 112 may be a page of an electronic book that a user of computing device 102 is reading. The digital scene associated with textual content 112 may include a depiction of what is described in textual content 112. As discussed above, augmentation module 108 may generate augmentation video feed 114 to include the digital scene overlayed, or superimposed, on a real-time video feed of physical scene 118. This overlaying, or superimposition, may make it appear to the reader as if textual content 112 is coming to life in front of the user's very eyes. In embodiments where only a portion of the digital scene is dynamically adapted based on the real-time video feed, augmentation module 108 may be configured to select the portion of the digital scene based on an orientation of camera 104. Such embodiments are discussed further in reference to FIG. 3 below.

In some embodiments, content augmentation environment 122 may also include a plane calculation module 110 coupled with augmentation module 108. Plane calculation module 110 may be configured to calculate one or more planes (e.g., planes 118 and 120) contained within frames of the real-time video feed. The one or more planes may be utilized by augmentation module 108 to dynamically adapt the digital scene to conform to the one or more planes prior to incorporation of the digital scene into the real-time video feed to produce the augmentation video feed, to be described more fully below with reference to FIG. 2.

As depicted, in some embodiments, textual content 112 may be rendered on a first portion of the display device while augmentation video feed 114 may be rendered on another portion of the display device. In other embodiments, where computing device 102 may include more than one display device, textual content 112 may be rendered on one of the displays while augmentation video feed 114 may be rendered on another display device. In still other embodiments, augmentation module 108 and/or digital content module 106 may be configured to accept input from a user of computing device to toggle between textual content 112 and augmentation video feed 114.

While computing device 102 is depicted herein as a tablet, it will be appreciated that this is merely for illustrative purposes. Computing device 102 may take the form of any type of portable or stationary computing device, such as, but not limited to, a smart phone, tablet, laptop, desktop, kiosk, or wearable computing devices such as, for example, Google Glass. Any computing device capable of carrying out the processes described herein is contemplated by this disclosure.

Figure 2:
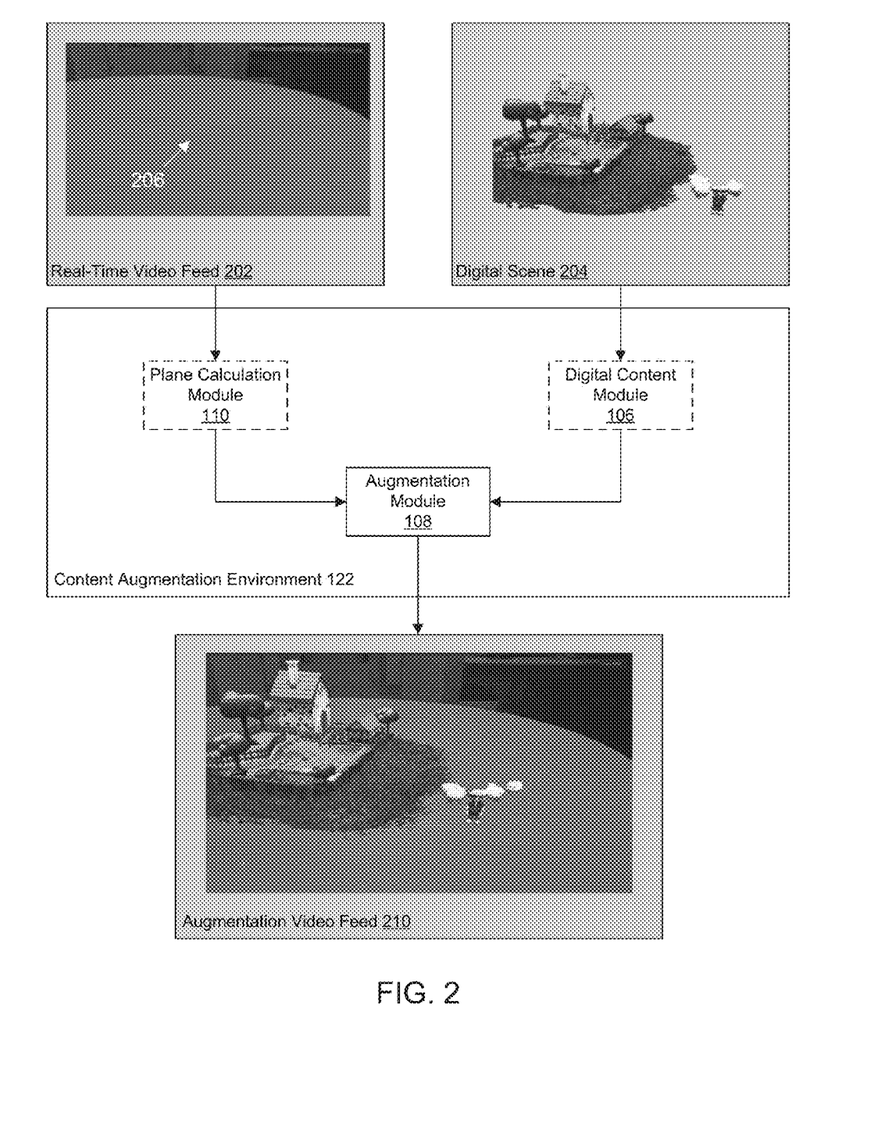
FIG. 2 is an illustrative depiction of an example content augmentation environment generating an augmentation video feed.

FIG. 2 is an illustrative depiction of an example content augmentation environment 122 generating an augmentation video feed 210. As discussed above content augmentation environment 122 may include digital content module 106, augmentation module 108 and plane calculation module 110. As depicted by the broken border, digital content module 106 and plane calculation module 110 may be present in some embodiments described below and omitted in other embodiments. In embodiments, content augmentation environment 122 may be configured to take in real-time video feed 202 and digital scene 204 and output augmentation video feed 210 for rendering on a display device of a computing device.

In some embodiments, augmentation module 108 may be configured to receive digital scene 204 directly. In such embodiments, augmentation module may passively receive digital scene 204 or may actively retrieve digital scene 204 from a storage location. In other embodiments, augmentation module 108 may be configured to receive digital scene 204 from digital content module 106.

In some embodiments, augmentation module 108 may be configured to receive real-time video feed 202 directly for use in adapting digital scene 204 based on the real-time video feed. In such embodiments, augmentation module 210 may incorporate digital scene 204 with real-time video feed 202 to create augmentation video feed 210. In other embodiments, plane calculation module 110 may be configured to receive real-time video feed 202 for processing and may in turn be configured to provide real-time video feed 202 and the results of any processing performed on real-time video feed 202 to augmentation module 108. In such embodiments, augmentation module 210 may be configured to utilize the results of the processing, in addition to real-time video feed 202, in adapting digital scene 204.

In some embodiments, plane calculation module 110 may receive real-time video feed 202 and may calculate one or more planes contained within real-time video feed 202 (e.g., the plane created by table 206). This may be accomplished through any conventional process, for example, by utilizing depth and color information contained within real-time video feed and captured by a camera (e.g., camera 104 of FIG. 1). From this depth and color information, plane calculation module 110 may calculate a three dimensional (3-D) point cloud. This 3-D point cloud may be utilized by plane calculation module 110 to create a 3-D mesh, such as a polygon mesh, triangle mesh, or any other such 3-D surface depiction. Plane calculation module 110, may then utilize the 3-D surface depiction to calculate the one or more 3-D planes of the physical scene, e.g., table top, floor and wall(s), etc. In some embodiments, the one or more 3D planes may be calculated by plane calculation module 110 based on either marker based (e.g., Simultaneous Location and Mapping (SLAM)) or marker-less detection. Alternatively, both techniques may be utilized by the plane calculation module to calculate the one or more 3-D planes. The one or more planes and real-time video feed may then be passed to augmentation module 108 which may be configured to conform digital scene 204 to the one or more planes. Augmentation module 210 may be configured to then incorporate the conformed digital scene with the real-time video feed 202 to produce augmentation video feed 210. Through this incorporation, augmentation video feed 210 may make it appear as if the digital scene is resting on a surface, such as the surface of table 206, right in front of a user of content augmentation environment 122

Figure 3:
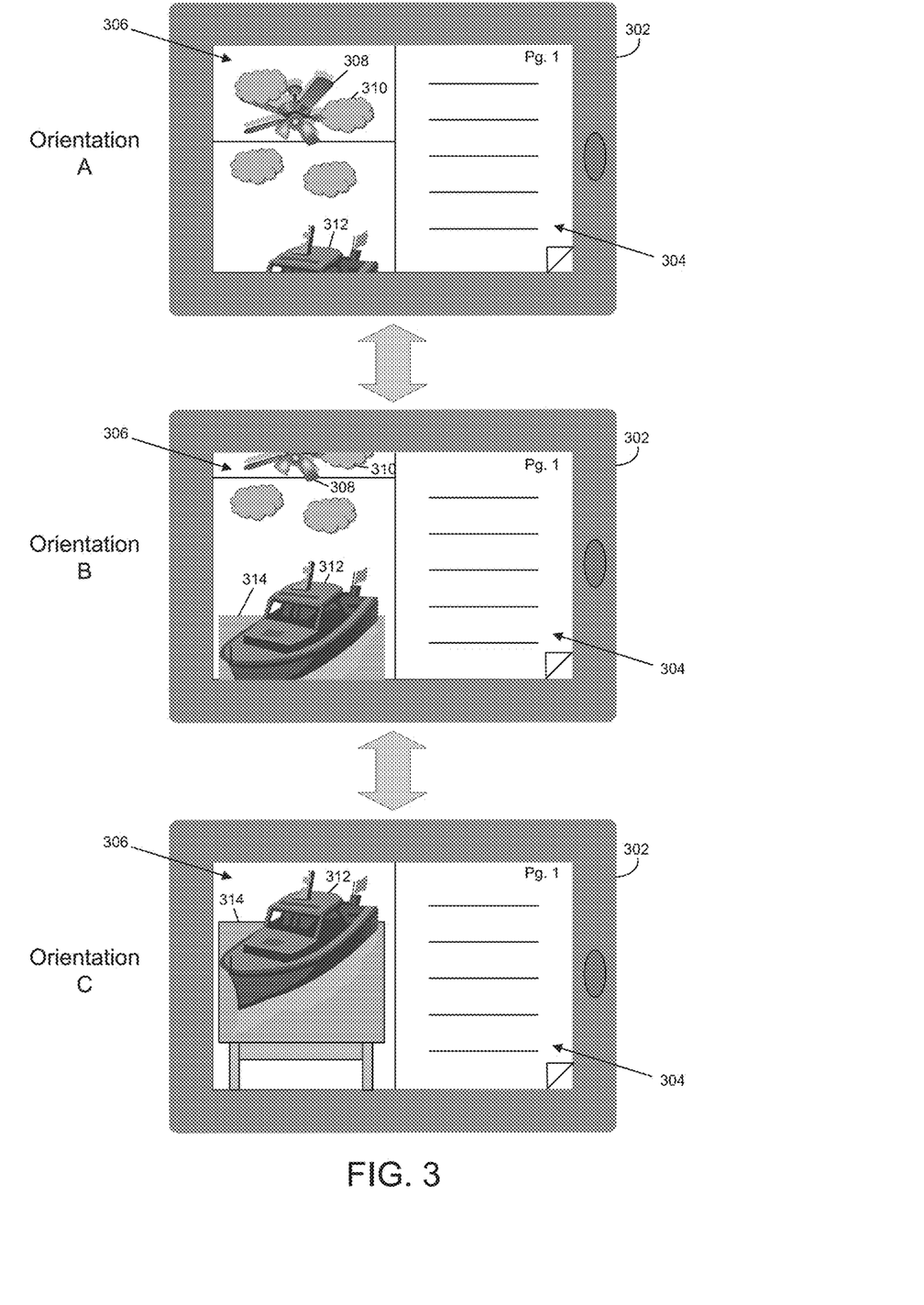
FIG. 3 is an illustrative depiction of various camera orientations and the effect of the various orientations on the portion of the digital scene, in accordance with various embodiments of the present disclosure.

FIG. 3 is an illustrative depiction of various camera orientations and the effect of the various orientations on the portion of the digital scene rendered on computing device 302, in accordance with various embodiments of the present disclosure. As mentioned above, in some embodiments, an augmentation module (e.g., augmentation module 108 of FIGS. 1 and 2) may be configured to select a portion of a digital scene based on an orientation of a camera capturing a real-time video feed (e.g. camera 104 of FIG. 1). In such embodiments, as the orientation of the camera changes, the portion of the digital scene may change as well. In an arrangement where the camera is integrated into the computing device, movement of the computing device may correspond with movement of the camera. As a result, movement of the computing device discussed below will be understood to include a corresponding movement of the integrated camera.

FIG. 3 depicts computing device 302 in three different orientations, A, B, and C, and the impact these orientations have on the digital scene and an augmentation video feed. Computing device 302 may be configured to carry out this process through the integration of a content augmentation environment (e.g., content augmentation environment 122 of FIGS. 1 and 2). The content augmentation environment may be configured to cause a portion of textual content 304 to be rendered on one portion of the display device and augmentation video feed 308 306 having a portion of a digital scene, associated with the portion of textual content 304, to be rendered on another portion of the display device.

At orientation A, computing device 302 may be positioned in an upwards orientation. As depicted, augmentation video feed 308 306 at orientation A may be composed of a portion of a digital scene selected by the content augmentation environment, or a module thereof. This portion of the digital scene may include clouds 310 and a top portion of a boat 312 incorporated with a real-time video feed. The real-time video feed, captured by the integrated camera, may include ceiling fan 308. As a result, augmentation video feed 308 306 at orientation A reflects that computing device 302 is positioned in an upwards orientation through the selection of a portion of the digital scene corresponding with such an orientation.

As computing device 302 is moved downwards to orientation B, the selected portion of the digital scene may change in a manner corresponding with such movement. As depicted, augmentation video feed 308 306 at orientation B may be composed of a different portion of the digital scene. The different portion of the digital scene may be selected by the content augmentation environment, or a module thereof, based on the downward movement. This different portion of the digital scene may still include clouds 310; however, the position of clouds 310 on the display device may move vertically on the display device as computing device 302 is moved down. Furthermore, while only a top of boat 312 was displayed at orientation A, almost the entirety of boat 312 is displayed at orientation B. In addition to the changes to the portion of the digital scene, the physical scene with which the portion of the digital scene is incorporated also changes based on the physical scene captured by the integrated camera at orientation B. As depicted, the physical scene still includes a portion of ceiling fan 308; however, ceiling fan 308 in the physical scene has moved in a similar manner to clouds 310. In addition, the physical scene now includes a top of a table 314. As discussed above, the content augmentation environment may be configured to calculate one or more planes created by table 314 and may adapt the portion of the digital scene to conform to the one or more planes. As depicted, boat 312 of the digital scene has been adapted in this manner to conform to table 314.

As computing device 302 is moved further downwards to orientation C, the selected portion of the digital scene continues to change in a manner corresponding with such movement. As depicted, augmentation video feed 308 306 at orientation C may be composed of a third portion of the digital scene. The third portion of the digital scene may also be selected by the content augmentation environment, or a module thereof, based on the downward movement. As can be seen, clouds 310 depicted in orientations A and B have moved out of frame in orientation C along with ceiling fan 308 of the physical scene. Boat 312 has moved further vertically as computing device 302 moved further downwards and a larger portion of table 314 is now captured in the physical scene.

While only three orientations are described above, it will be appreciated that the transitions from one orientation to another may be depicted by augmentation video feed in real-time as movement of the computing device is sensed. Such movement may be sensed in any manner including, but not limited to, use of a gyroscope, accelerometer, and/or markers within frames of the real-time video feed. In addition, while movement of computing device 302 is discussed above in a single downward direction, the computing device may be moved in any direction including laterally.

Figure 4:
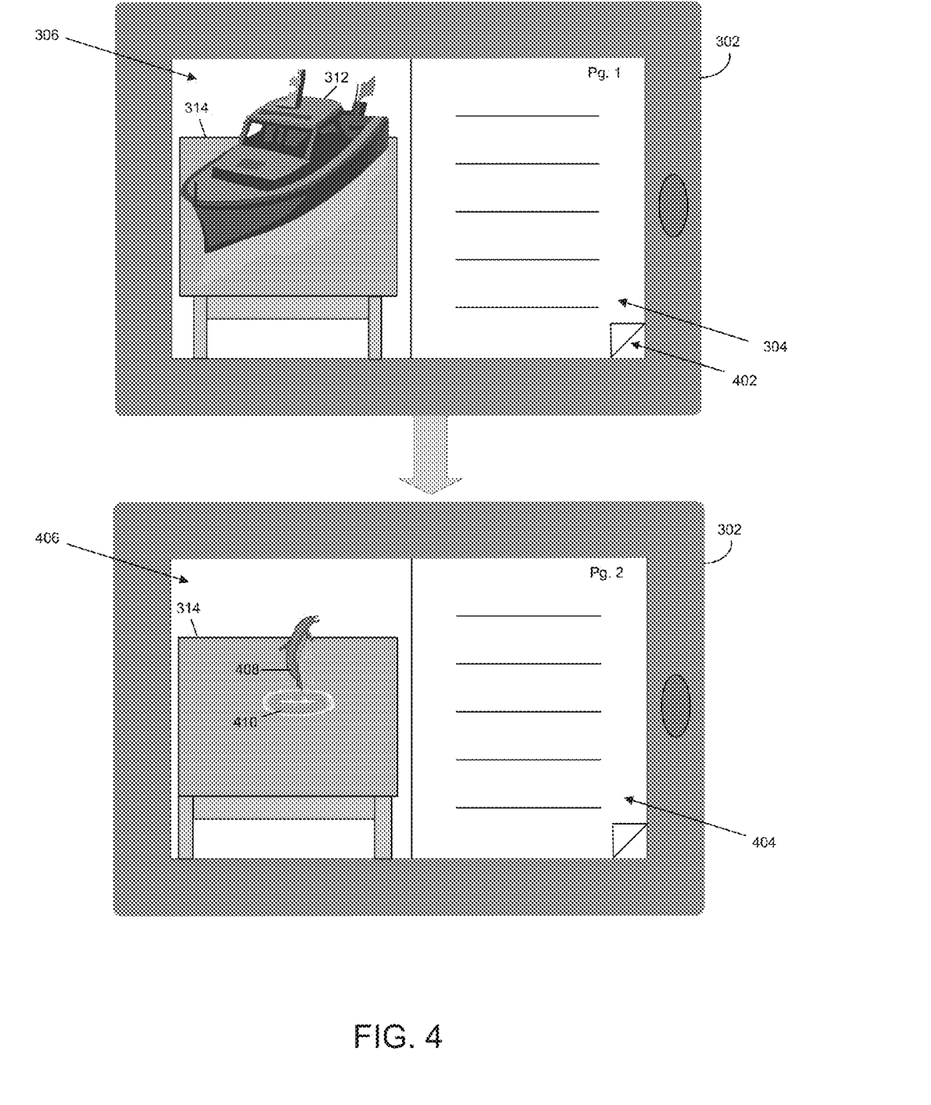
FIG. 4 is an illustrative depiction of navigation from a first portion of textual content to a second portion of textual content, in accordance with various embodiments of the present disclosure.

FIG. 4 is an illustrative depiction of navigation from a first portion of textual content 304 to a second portion of textual content 402. FIG. 4 continues from FIG. 3 and as a result some of the same reference numbers are utilized therein. As depicted, computing device 302 may begin with a rendering of a first portion of textual content 304 along with an augmentation video feed 306 depicting a digital scene, associated with the first portion of textual content 304, incorporated with a real-time video feed capture by the camera integrated with computing device 302.

In embodiments, content augmentation environment, or a module therein, may be configured to accept input from a user of computing device 302 to navigate to a second portion of textual content 404. In such embodiments, the user may navigate to the second portion of textual content 404 by, for example, interacting with a portion of the display device of computing device 302, such as portion 402; through the use of a table of contents, index, or the like where the user may select the second portion of textual content 404 from a list of various portions of the textual content; or in any other suitable manner.

Once content augmentation environment has received such input from the user, the content augmentation environment may cause the second portion of textual content to be rendered on the display device of computing device 302 and may also cause a new digital scene associated with the second portion of textual content to be incorporated with the real-time video feed into a new augmentation video feed 406. As depicted, the real-time video feed may not change unless there is a change to the orientation of the camera capturing the video feed. As such, augmentation video feed 406 includes table 314 from the real-time video feed incorporated with the new digital scene, depicted here as dolphin 408 jumping out of water 410.

Figure 5:
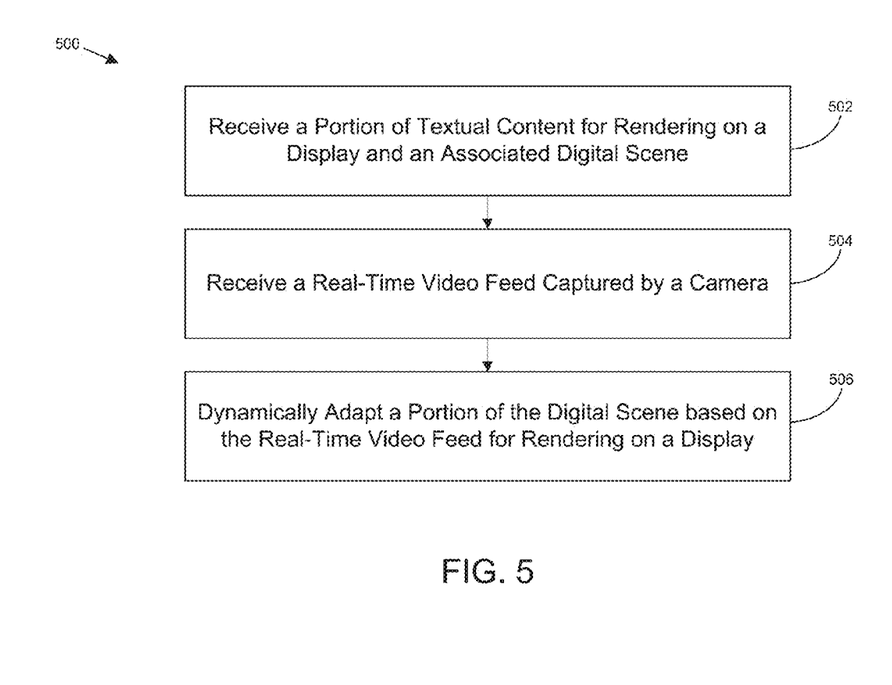
FIG. 5 illustrates an example process flow for dynamic adaptation of a digital scene to augment textual content, in accordance with various embodiments of the present disclosure.

FIG. 5 illustrates an example process flow 500 for dynamic adaptation of a digital scene to augment textual content, in accordance with various embodiments of the present disclosure. Process flow 500 may be carried out by a content augmentation environment executing on a computing device, such as the content augmentation environment discussed elsewhere herein, or any modules or combination of modules of the content augmentation environment, hereinafter collectively referred to as content augmentation environment for simplicity.

The process may begin at block 502 where a portion of textual content may be received by the content augmentation environment for rendering on a display device coupled with the content augmentation environment. In addition, a digital scene associated with the textual content may also be received by content augmentation environment. In some embodiments, content augmentation environment may receive the portion of textual content and the digital scene from another component of computing device. In other embodiments, content augmentation environment may retrieve the portion of textual content and the associated digital scene, for example, in response to selection of the portion of textual content by a user. In such embodiments, content augmentation environment may retrieve the portion of textual content and the associated digital scene from a local storage location or a remote storage location. In some embodiments, the portion of textual content and the associated digital scene may be provided by a remote service, such as a service providing digital books, magazines, etc.

Once the portion of textual content and the associated digital scene have been received by the content augmentation environment, the process may proceed to block 504 where content augmentation environment may receive a real-time video feed captured by a camera coupled with the content augmentation environment. At block 506 content augmentation environment may dynamically adapt, as discussed elsewhere herein, a portion of the digital scene based on the real-time video feed for rendering on a display device coupled with the content augmentation environment.

Figure 6:
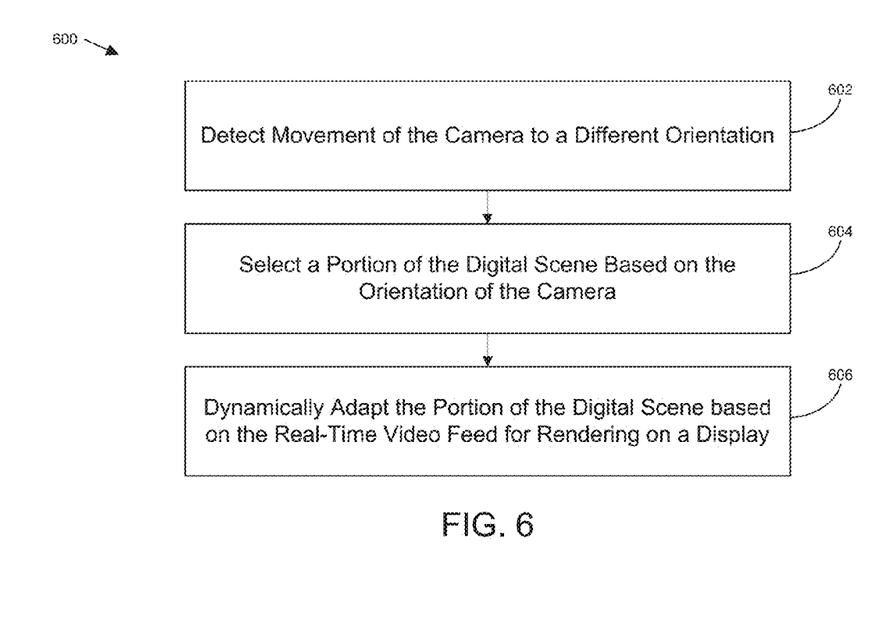
FIG. 6 illustrates an example process flow 600 for selecting a portion of a digital scene based on camera orientation, in accordance with various embodiments of the present disclosure.

FIG. 6 illustrates an example process flow 600 for selecting a portion of a digital scene based on camera orientation, in accordance with various embodiments of the present disclosure. Process flow 600 may be carried out by a content augmentation environment executing on a computing device, such as the content augmentation environment discussed elsewhere herein, or any modules or combination of modules of the content augmentation environment, hereinafter collectively referred to as content augmentation environment for simplicity.

The process may begin at block 602 where movement of the camera to a different orientation may be detected by content augmentation environment. Such movement may be sensed in any manner including, but not limited to, use of a gyroscope, accelerometer, and/or markers within frames of the real-time video feed. Once movement of the camera to a different orientation is detected, a portion of the digital scene based on the different orientation may be selected by content augmentation environment at block 604. At block 606 content augmentation environment may dynamically adapt the selected portion of the digital scene based on the real-time video feed for rendering on a display device to augment a portion of textual content.

Figure 7:
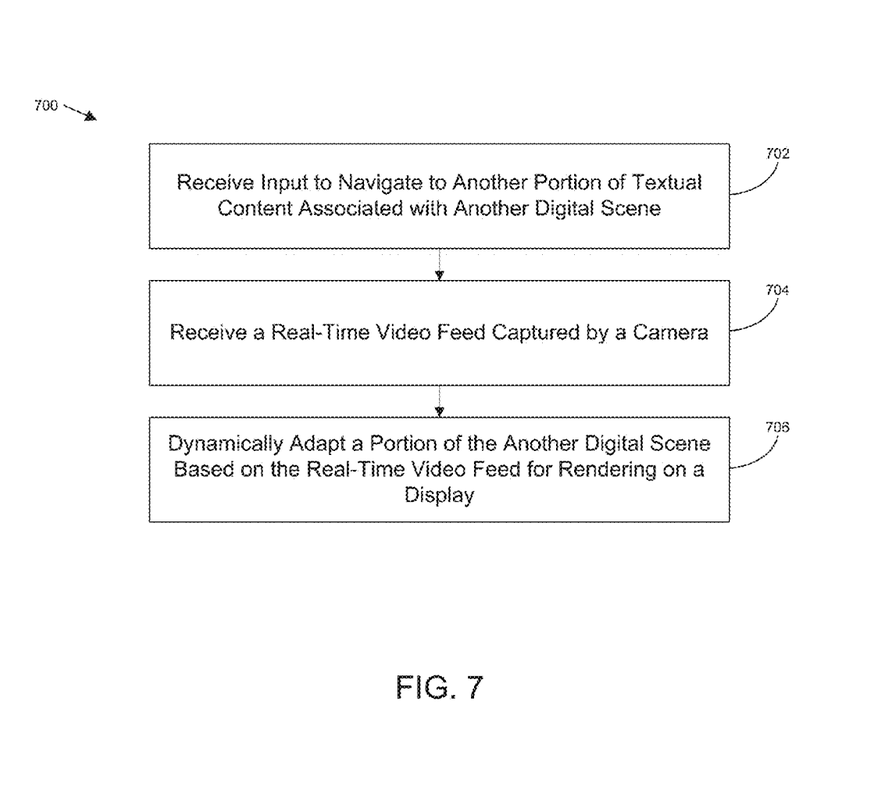
FIG. 7 illustrates an example process flow for navigation from one portion of textual content to another portion of textual content, in accordance with various embodiments of the present disclosure.

FIG. 7 illustrates an example process flow 700 for navigation from one portion of textual content to another portion of textual content, in accordance with various embodiments of the present disclosure. Process flow 700 may be carried out by a content augmentation environment executing on a computing device, such as the content augmentation environment discussed elsewhere herein, or any modules or combination of modules of the content augmentation environment, hereinafter collectively referred to as content augmentation environment for simplicity.

The process may begin at block 702 where content augmentation environment may receive input to navigate to another portion of textual content associated with another digital scene. In embodiments, the input may be received in response to a user of the computing device interacting with navigational input portion of a display device, such as 402 of FIG. 4. In other embodiments the input may be received in response to a user selecting another portion of textual content from a list of various portions of textual content such as a table of contents, index, etc.

Once the input to navigate to another portion of textual content has been received by the content augmentation environment, the process may proceed to block 704 where content augmentation environment may receive a real-time video feed captured by a camera coupled with the content augmentation environment. At block 706 content augmentation environment may dynamically adapt, as discussed elsewhere herein, a portion of the another digital scene based on the real-time video feed for rendering on a display device coupled with the content augmentation environment.

Figure 8:
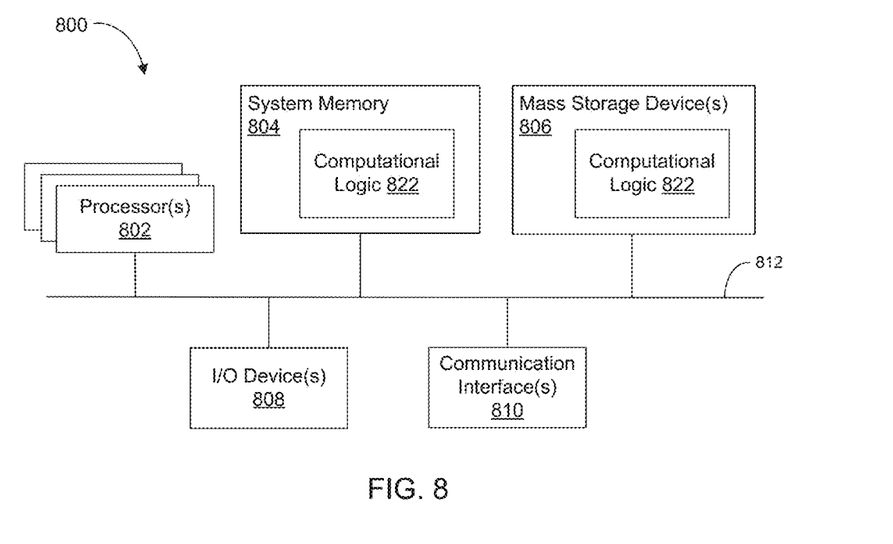
FIG. 8 is a schematic illustration of an example computing device, in accordance with various embodiments of the present disclosure.

Referring now to FIG. 8, wherein an example computing device suitable to implement a content augmentation environment 122, in accordance with various embodiments, is illustrated. As shown, computing device 800 may include one or more processors or processor cores 802, and system memory 804. In embodiments, multiple processor cores 802 may be disposed on one die. For the purpose of this application, including the claims, the terms "processor" and "processor cores" may be considered synonymous, unless the context clearly requires otherwise. Additionally, computing device 800 may include mass storage device(s) 806 (such as diskette, hard drive, compact disc read-only memory (CD-ROM), and so forth), input/output (I/O) device(s) 808 (such as camera, display device, keyboard, cursor control, gyroscope, accelerometer, and so forth), and communication interfaces 810 (such as network interface cards, modems, and so forth). In embodiments, a display device may be touch screen sensitive and may include a display screen, one or more processors, storage medium, and communication elements. Further, it may be removably docked or undocked from a base platform having the keyboard. The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device(s) 806 may be employed to store a working copy and a permanent copy of programming instructions implementing the operations described earlier, e.g., but not limited to, operations associated with digital content module 106, augmentation module 108, plane calculation module 110, and/or content augmentation environment 122, generally referred to as computational logic 822. The various operations may be implemented by assembler instructions supported by processor(s) 802 or high-level languages, such as, for example, C, that may be compiled into such instructions.

The permanent copy of the programming instructions may be placed into permanent mass storage device(s) 806 in the factory, or in the field, through, for example, a distribution medium (not shown), such as a compact disc (CD), or through communication interface 810 (from a distribution server (not shown)). That is, one or more distribution media having an implementation of digital content module 106, augmentation module 108, plane calculation module 110, and/or content augmentation environment 122 may be employed to distribute these components to various computing devices.

The number, capability, and/or capacity of these elements 810-812 may vary, depending on the intended use of example computing device 800, e.g., whether example computer 800 is a smartphone, tablet, ultrabook, laptop, or desktop. The constitutions of these elements 810-812 are otherwise known, and accordingly will not be further described.

Figure 9:
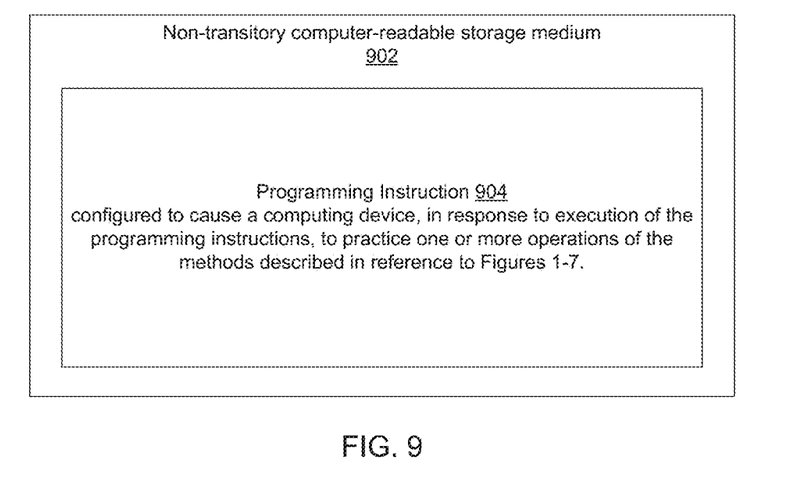
FIG. 9 illustrates an example non-transitory computer-readable storage medium having instructions configured to practice all or selected ones of the operations associated with the processes described above.

FIG. 9 illustrates an example non-transitory computer-readable storage medium having instructions configured to practice all or selected ones of the operations associated with the processes described above. As illustrated, non-transitory computer-readable storage medium 902 may include a number of programming instructions 904. Programming instructions 904 may be configured to enable a device, e.g., computing device 800, in response to execution of the programming instructions, to perform one or more operations of the processes described in reference to FIGS. 1-7. In alternate embodiments, programming instructions 904 may be disposed on multiple non-transitory computer-readable storage media 902 instead. In still other embodiments, programming instructions 904 may be encoded in transitory computer-readable signals.

Referring back to FIG. 8, for one embodiment, at least one of processors 802 may be packaged together with computational logic 822 (in lieu of storing in memory 804 and/or mass storage 806) configured to perform one or more operations of the processes described with reference to FIGS. 1-7. For one embodiment, at least one of processors 802 may be packaged together with computational logic 822 configured to practice aspects of the methods described in reference to FIGS. 1-7 to form a System in Package (SiP). For one embodiment, at least one of processors 802 may be integrated on the same die with computational logic 822 configured to perform one or more operations of the processes described in reference to FIGS. 1-7. For one embodiment, at least one of processors 802 may be packaged together with computational logic 822 configured to perform one or more operations of the process described in reference to FIGS. 1-7 to form a System on Chip (SoC). Such an SoC may be utilized in any suitable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Some non-limiting examples are:

Example 1 is a computing device comprising one or more display devices; a digital content module coupled with the one or more display devices, the digital content module to cause a portion of textual content to be rendered on the one or more display devices, wherein the textual content is associated with a digital scene to be utilized in augmenting the textual content; and an augmentation module coupled with the digital content module and the one or more display devices to dynamically adapt the digital scene, based at least in part on a real-time video feed captured by a camera communicatively coupled with the computing device, to be rendered on the one or more display devices to augment the textual content.

Example 2 may include the subject matter of Example 1, wherein to dynamically adapt the digital scene is to incorporate at least a portion of the digital scene with the real time video feed to produce an augmentation video feed to augment the textual content.

Example 3 may include the subject matter of Example 2, wherein the digital content module is to cause the textual content to be rendered on a first portion of the one or more display devices, and the augmentation module is to cause the augmentation video feed to be rendered on a second portion of the one or more display devices.

Example 4 may include the subject matter of either of Examples 2 or 3, further comprising a plane calculation module coupled with the augmentation module to calculate one or more planes contained within frames of the real-time video feed, and wherein to dynamically adapt the portion of the digital scene is further to adapt the portion of the digital scene to conform to the one or more planes prior to incorporation into the real-time video feed to produce the augmentation video feed.

Example 5 may include the subject matter of any one of Examples 2-4, wherein the augmentation module is to select the portion of the digital scene based on an orientation of the camera.

Example 6 may include the subject matter of Example 5, further comprising the camera, wherein a change in an orientation of the computing device causes a corresponding change to the orientation of the camera.

Example 7 may include the subject matter of Example 5, wherein the augmentation module is further to: detect movement of the camera to a new orientation; select another portion of the digital scene that corresponds with the new orientation; and dynamically adapt the another portion of the digital scene based at least in part on the real-time video feed captured by the camera at the new orientation; wherein dynamically adapt includes incorporation of the another portion of the digital scene with the real-time video feed to modify the augmentation video feed to reflect the new orientation.

Example 8 may include the subject matter of Example 7, further comprising a gyroscope or an accelerometer, wherein the augmentation module is to detect a change in orientation of the camera through either or both of the gyroscope or accelerometer.

Example 9 may include the subject matter of Example 7, wherein the video feed comprises a marker, and the augmentation module is to detect a change in orientation of the camera through detection of movement of the marker within the video feed.

Example 10 may include the subject matter of any one of Examples 1-9, wherein the digital content module is further to render a second portion of the textual content in response to input to navigate to the second portion of the textual content, wherein the second portion of the textual content is associated with another digital scene to be rendered to augment the second portion of the textual content, and wherein the augmentation module is to dynamically adapt the another digital scene in view of the real-time video feed to augment the second portion of the textual content.

Example 11 may include the subject matter of any one of Examples 1-10, wherein the first portion of the one or more display devices is a first display device of the one or more display devices and the second portion of the one or more display devices is a second display device of the one or more display devices.

Example 12 may include the subject matter of any one of Examples 1-11, wherein the computing device is a tablet, e-reader, smartphone, laptop, or wearable computing device.

Example 13 is a computer implemented method comprising receiving, by a content augmentation environment of a computing device, a portion of textual content for rendering on one or more display devices of the computing device, wherein the textual content is associated with a digital scene to be utilized in augmenting the textual content; and dynamically adapting, by the content augmentation environment, the digital scene, based at least in part on a real-time video feed captured by a camera of the computing device, for rendering on the one or more display devices to augment the textual content.

Example 14 may include the subject matter of Example 13, wherein dynamically adapting the digital scene further comprises incorporating at least a portion of the digital scene with the real time video feed to produce an augmentation video feed to augment the textual content.

Example 15 may include the subject matter of Example 14, further comprising causing, by the content augmentation environment, the textual content to be rendered on a first portion of the one or more display devices, and the augmentation video feed to be rendered on a second portion of the one or more display devices.

Example 16 may include the subject matter of either of Examples 14 or 15, wherein dynamically adapting the digital scene further comprises: calculating one or more planes contained within frames of the real-time video feed; and adapting the portion of the digital scene to conform to the one or more planes prior to incorporating the portion of the digital scene into the real-time video feed to produce the augmentation video feed.

Example 17 may include the subject matter of any one of Examples 14-16, further comprising selecting, by the content augmentation environment, the portion of the digital scene based on an orientation of the camera.

Example 18 may include the subject matter of Example 17, wherein changing an orientation of the computing device causes a corresponding change to the orientation of the camera.

Example 19 may include the subject matter of Example 17, further comprising: detecting, by the content augmentation environment, movement of the camera to a new orientation; selecting, by the content augmentation environment, another portion of the digital scene that corresponds with the new orientation; and dynamically adapting, by the content augmentation environment, the another portion of the digital scene based at least in part on the real-time video feed captured by the camera at the new orientation; wherein dynamically adapting includes modifying the augmentation video feed to reflect the new orientation by incorporating the another portion of the digital scene with the real-time video feed.

Example 20 may include the subject matter of Example 19, wherein detecting movement of the camera to the new orientation further comprises detecting the movement of the camera via either or both of a gyroscope or accelerometer.

Example 21 may include the subject matter of Example 19, wherein detecting movement of the camera to the new orientation further comprises detecting movement of a marker within the video feed.

Example 22 may include the subject matter of any one of Examples 13-21, further comprising: receiving, by the content augmentation environment, input to navigate to a second portion of the textual content, wherein the second portion of the textual content is associated with another digital scene for rendering to augment the second portion of the textual content, and wherein the content augmentation environment is to dynamically adapt the another digital scene in view of the real-time video feed to augment the second portion of the textual content.

Example 23 may include the subject matter of any one of Examples 13-22, wherein the first portion of the one or more display devices is a first display device of the one or more display devices and the second portion of the one or more display devices is a second display device of the one or more display devices.

Example 24 is one or more computer-readable storage media having instructions stored thereon which, when executed by a computing device, provide the computing device with a content augmentation environment to: select a portion of textual content to be rendered on one or more display devices of the computing device, wherein the textual content is associated with a digital scene to be utilized in augmentation of the textual content; and dynamically adapt the digital scene, based at least in part on a real-time video feed captured by a camera of the computing device, to be rendered on the one or more display devices to augment the textual content.

Example 25 may include the subject matter of Example 24, wherein to dynamically adapt the digital scene further comprises incorporation of at least a portion of the digital scene with the real time video feed to produce an augmentation video feed to augment the textual content.

Example 26 may include the subject matter of Example 25, wherein the content augmentation environment is further to cause the textual content to be rendered on a first portion of the one or more display devices, and the augmentation video feed to be rendered on a second portion of the one or more display devices.

Example 27 may include the subject matter of either of Examples 25 or 26, wherein the content augmentation environment is further to calculate one or more planes contained within frames of the real-time video feed, and wherein to dynamically adapt the digital scene further comprises adaptation of the portion of the digital scene to conform to the one or more planes prior to incorporation of the portion of the digital scene into the real-time video feed to produce the augmentation video feed.

Example 28 may include the subject matter of any one of Examples 25-27, wherein the content augmentation environment is further to select the portion of the digital scene based on an orientation of the camera.

Example 29 may include the subject matter of Example 28, wherein a changing in orientation of the computing device causes a corresponding change to the orientation of the camera.

Example 30 may include the subject matter of Example 28, wherein the content augmentation environment is further to: detect movement of the camera to a new orientation; select another portion of the digital scene that corresponds with the new orientation; and dynamically adapt the another portion of the digital scene based at least in part on the real-time video feed captured by the camera at the new orientation; wherein to dynamically adapt includes modification of the augmentation video feed to reflect the new orientation through incorporation of the another portion of the digital scene with the real-time video feed.

Example 31 may include the subject matter of Example 30, wherein to detect movement of the camera to the new orientation further comprises detect the movement of the camera via either or both of a gyroscope or accelerometer.

Example 32 may include the subject matter of Example 30, wherein to detect movement of the camera to the new orientation further comprises detect movement of a marker within the video feed.

Example 33 may include the subject matter of any one of Examples 24-32, wherein the content augmentation environment is further to: receive input to navigate to a second portion of the textual content, wherein the second portion of the textual content is associated with another digital scene to be rendered to augment the second portion of the textual content; and dynamically adapt the another digital scene in view of the real-time video feed to augment the second portion of the textual content.

Example 34 may include the subject matter of any one of Examples 24-33, wherein the first portion of the one or more display devices is a first display device of the one or more display devices and the second portion of the one or more display devices is a second display device of the one or more display devices.

Example 35 is a computing device comprising: means for selecting a portion of textual content for rendering on one or more display devices of the computing device, wherein the textual content is associated with a digital scene to be utilized in augmenting the textual content; and means for dynamically adapting the digital scene, based at least in part on a real-time video feed captured by a camera of the computing device, for rendering on the one or more display devices to augment the textual content.

Example 36 may include the subject matter of Example 35, wherein the means for dynamically adapting the digital scene further comprises means for incorporating at least a portion of the digital scene with the real time video feed to produce an augmentation video feed to augment the textual content.

Example 37 may include the subject matter of Example 36, further comprising means for causing the textual content to be rendered on a first portion of the one or more display devices, and the augmentation video feed to be rendered on a second portion of the one or more display devices.

Example 38 may include the subject matter of either of Examples 36 or 37, further comprising means for calculating one or more planes contained within frames of the real-time video feed, wherein dynamically adapting the digital scene further comprises adapting the portion of the digital scene to conform to the one or more planes prior to incorporating the portion of the digital scene into the real-time video feed to produce the augmentation video feed.

Example 39 may include the subject matter of any one of Examples 36-38, further comprising means for selecting the portion of the digital scene based on an orientation of the camera.

Example 40 may include the subject matter of Example 39, wherein changing an orientation of the computing device causes a corresponding change to the orientation of the camera.

Example 41 may include the subject matter of Example 39, further comprising: means for detecting movement of the camera to a new orientation; means for selecting another portion of the digital scene that corresponds with the new orientation; and means for dynamically adapting the another portion of the digital scene based at least in part on the real-time video feed captured by the camera at the new orientation; wherein dynamically adapting includes modifying the augmentation video feed to reflect the new orientation by incorporating the another portion of the digital scene with the real-time video feed.

Example 42 may include the subject matter of Example 41, wherein detecting movement of the camera to the new orientation further comprises detecting the movement of the camera via either or both of a gyroscope or accelerometer.

Example 43 may include the subject matter of Example 41, wherein detecting movement of the camera to the new orientation further comprises detecting movement of a marker within the video feed.

Example 44 may include the subject matter of any one of Examples 35-43, further comprising: means for receiving input to navigate to a second portion of the textual content, wherein the second portion of the textual content is associated with another digital scene for rendering to augment the second portion of the textual content; and means for dynamically adapting the another digital scene in view of the real-time video feed to augment the second portion of the textual content.

Example 45 may include the subject matter of any one of Examples 35-44, wherein the first portion of the one or more display devices is a first display device of the one or more display devices and the second portion of the one or more display devices is a second display device of the one or more display devices.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A computing device comprising:
   one or more display devices;
   a digital content module coupled with the one or more display devices, the digital content module to cause a portion of textual content to be rendered on the one or more display devices, wherein the portion of textual content is associated with a digital scene to be utilized in augmenting the textual content, wherein the portion of textual context is associated with content of a digital magazine and information associating the portion of textual context with the digital scene is included in metadata of the portion of textual content; and
   an augmentation module coupled with the digital content module and the one or more display devices to dynamically adapt the digital scene, based at least in part on a real-time video feed captured by a camera communicatively coupled with the computing device, to be rendered on the one or more display devices to augment the textual content, wherein the adapted digital scene is rendered via an augmentation video feed displayed according to a panning of the adapted digital scene in response to an upwards, downwards, or lateral orientation of the camera and including digital elements of the adapted digital scene mapped to corresponding locations of physical elements in the real-time video feed, wherein the digital content module is to access a database that relates the portion of textual content to the digital scene and the access is provided via the metadata of the portion of textual content.

2. The computing device of claim 1, wherein to dynamically adapt the digital scene is to incorporate at least a portion of the digital scene with the real-time video feed to produce the augmentation video feed to augment the textual content.

3. The computing device of claim 2, wherein the digital content module is to cause the textual content to be rendered on a first portion of the one or more display devices, and the augmentation video feed to be rendered on a second portion of the one or more display devices.

4. The computing device of claim 2, further comprising a plane calculation module coupled with the augmentation module to calculate one or more planes contained within frames of the real-time video feed, and wherein to dynamically adapt the portion of the digital scene is further to adapt the portion of the digital scene to conform to the one or more planes prior to incorporation into the real-time video feed to produce the augmentation video feed.

5. The computing device of claim 1, further comprising the camera, wherein a change in an orientation of the computing device causes a corresponding change to the orientation of the camera.

6. The computing device of claim 1, wherein the augmentation module is further to:
   detect movement of the camera to a new location;
   select another portion of the digital scene that corresponds with the new location; and
   dynamically adapt the another portion of the digital scene based at least in part on the real-time video feed captured by the camera at the new location; wherein dynamically adapt includes incorporation of the another portion of the digital scene with the real-time video feed to modify an augmentation video feed to reflect the new location.

7. The computing device of claim 6, further comprising a gyroscope or an accelerometer, wherein the augmentation module is to detect a change in orientation of the camera through either or both of the gyroscope or accelerometer.

8. The computing device of claim 1, wherein the computing device is a tablet, e-reader, smartphone, laptop, or wearable computing device.

9. The computing device of claim 1, wherein the information included in the metadata of the portion of textual content includes information associating the portion of textual context with a digital scene including animated or static images to be displayed according to the panning of the adapted digital scene.

10. A computer implemented method comprising:
receiving, by a content augmentation environment of a computing device, a portion of textual content for rendering on one or more display devices of the computing device, wherein the textual content is associated with a digital scene to be utilized in augmenting the textual content, wherein the textual context is associated with content of a digital magazine and information associating the textual context with the digital scene is included in metadata of the textual content accessed by the content augmentation environment;
dynamically adapting, by the content augmentation environment, a portion of the digital scene, based at least in part on a real-time video feed captured by a camera of the computing device, for rendering on the one or more display devices to augment the portion of textual content, wherein the portion of the digital scene that is adapted is rendered via an augmentation video feed displayed according to a panning of the digital scene in response to an upwards, downwards, or lateral orientation of the camera and includes the portion of the digital scene including digital elements mapped to corresponding locations of physical elements in the real-time video feed, and wherein the content augmentation environment is to access a database that relates the portion of textual content to the digital scene and the access is provided via the metadata of the portion of textual content.

11. The method of claim 10, further comprising causing, by the content augmentation environment, the textual content to be rendered on a first portion of the one or more display devices, and the augmentation video feed to be rendered on a second portion of the one or more display devices.

12. The method of claim 10, wherein dynamically adapting the portion of the digital scene further comprises
calculating one or more planes contained within frames of the real-time video feed; and
adapting the portion of the digital scene to conform to the one or more planes prior to incorporating the portion of the digital scene into the real-time video feed to produce the augmentation video feed.

13. The method of claim 10, further comprising:
detecting, by the content augmentation environment, movement of the camera to a new location;
selecting, by the content augmentation environment, another portion of the digital scene that corresponds with the new location; and
dynamically adapting, by the content augmentation environment, the another portion of the digital scene based at least in part on the real-time video feed captured by the camera at the new location; wherein dynamically adapting includes modifying an augmentation video feed to reflect the new location by incorporating the another portion of the digital scene with the real-time video feed.

14. The method of claim 10, further comprising:
receiving, by the content augmentation environment, input to navigate to a second portion of the textual content, wherein the second portion of the textual content is associated with another digital scene for rendering to augment the second portion of the textual content, and wherein the content augmentation environment is to dynamically adapt the another digital scene in view of the real-time video feed to augment the second portion of the textual content.

15. One or more non-transitory computer-readable storage media having instructions stored thereon which, when executed by a computing device, provide the computing device with a content augmentation environment to:
select a portion of textual content to be rendered on one or more display devices of the computing device, wherein the textual content is associated with a digital scene to be utilized in augmentation of the textual content and wherein the textual context is associated with content of a digital magazine and information associating the portion of textual context with the digital scene is included in metadata of the textual content;
dynamically adapt the digital scene, based at least in part on a real-time video feed captured by a camera of the computing device, to be rendered on the one or more display devices to augment the textual content;
wherein the digital scene that is adapted is to be rendered via an augmentation video feed displayed according to a panning of the digital scene in response to an upwards, downwards, or lateral orientation of the camera and includes a selected portion of the digital scene including digital elements mapped to corresponding locations of physical elements captured in the real-time video feed; and
access a database that relates the portion of textual content to the digital scene, wherein the access is provided via the metadata of the portion of textual content.

16. The non-transitory computer-readable storage media of claim 15, wherein the content augmentation environment is further to cause the textual content to be rendered on a first portion of the one or more display devices, and the augmentation video feed to be rendered on a second portion of the one or more display devices.

17. The non-transitory computer-readable storage media of claim 15, wherein the content augmentation environment is further to calculate one or more planes contained within frames of the real-time video feed, and wherein to dynamically adapt the digital scene further comprises adaptation of the portion of the digital scene to conform to the one or more planes prior to an incorporation of the portion of the digital scene into the real-time video feed to produce the augmentation video feed.

18. The non-transitory computer-readable storage media of claim 15, wherein the content augmentation environment is further to:
detect movement of the camera to a new location;
select another portion of the digital scene that corresponds with the new location; and
dynamically adapt the another portion of the digital scene based at least in part on the real-time video feed captured by the camera at the new location; wherein to dynamically adapt includes modification of an augmentation video feed to reflect the new location through incorporation of the another portion of the digital scene with the real-time video feed.

19. The non-transitory computer-readable storage media of claim 15, wherein to detect movement of the camera to the upwards, downwards, or lateral orientation further comprises to detect movement of a marker within the real time video feed.

20. The non-transitory computer-readable storage media of claim 15, wherein the content augmentation environment is further to:
- receive input to navigate to a second portion of the textual content, wherein the second portion of the textual content is associated with another digital scene to be rendered to augment the second portion of the textual content; and
- dynamically adapt the another digital scene in view of the real-time video feed to augment the second portion of the textual content.

21. The non-transitory computer-readable storage media of claim 20, wherein a first portion of the one or more display devices is a first display device of the one or more display devices and the second portion of the one or more display devices is a second display device of the one or more display devices.

* * * * *